United States Patent [19]
Adams et al.

[11] 3,851,542
[45] Dec. 3, 1974

[54] COLLAPSIBLE STEERING COLUMNS

[75] Inventors: Frederick John Adams, Campton; Howard Kenneth Alderton, Luton, both of England

[73] Assignee: Cam Gears Limited, Hitchin, Hertfordshire, England

[22] Filed: May 1, 1973

[21] Appl. No.: 356,084

[30] Foreign Application Priority Data
May 2, 1972  Great Britain..................... 20281/72

[52] U.S. Cl................................... 74/492, 188/1 C
[51] Int. Cl............................................... B62d 1/18
[58] Field of Search....... 74/492; 180/82 R; 188/1 C

[56] References Cited
UNITED STATES PATENTS

| | | | |
|---|---|---|---|
| 3,412,628 | 11/1968 | De Gain | 74/492 |
| 3,468,181 | 9/1969 | Millar | 74/492 |
| 3,479,902 | 11/1969 | Okamoto | 74/492 |
| 3,538,785 | 11/1970 | Grancon | 74/492 |
| 3,714,841 | 2/1973 | Grosseau | 74/492 |

*Primary Examiner*—Samuel Scott
*Assistant Examiner*—F. D. Shoemaker
*Attorney, Agent, or Firm*—Hill, Gross, Simpson, Van Santen, Steadman, Chiara & Simpson

[57] ABSTRACT

A collapsible steering column employs a telescopic co-axial shaft and tube structure and a separate deforming member within the tube which is forced through the tube by the shaft upon axial collapse of the assembly to deform, or be deformed by, the tube with consequent absorption of energy. The deforming member may be dish-shaped, a plug, a collapsible split ring, or other suitable shape and may be constructed of a ductile material such as mild steel, copper, aluminum or plastics, or a rubbery material.

12 Claims, 8 Drawing Figures

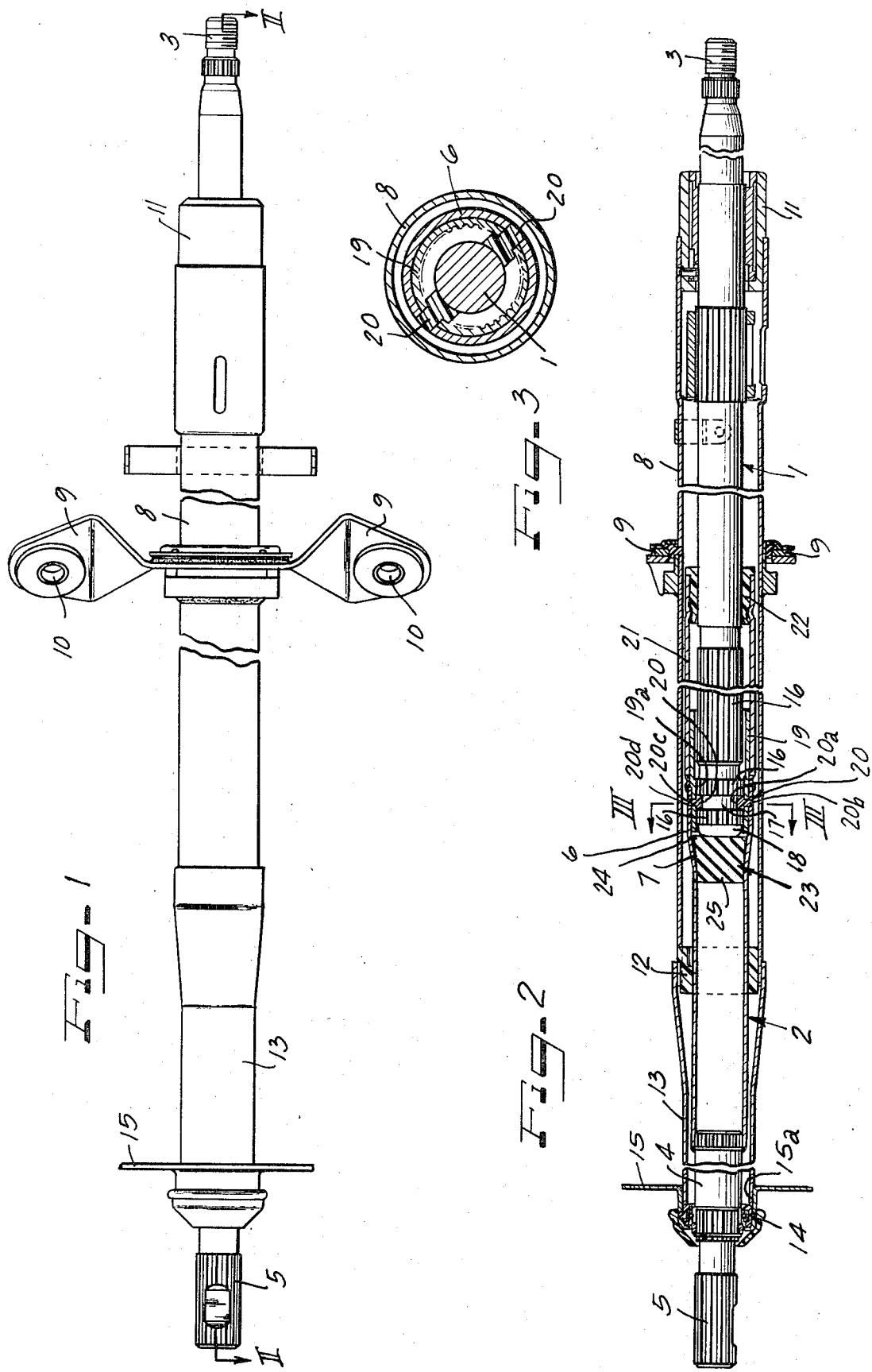

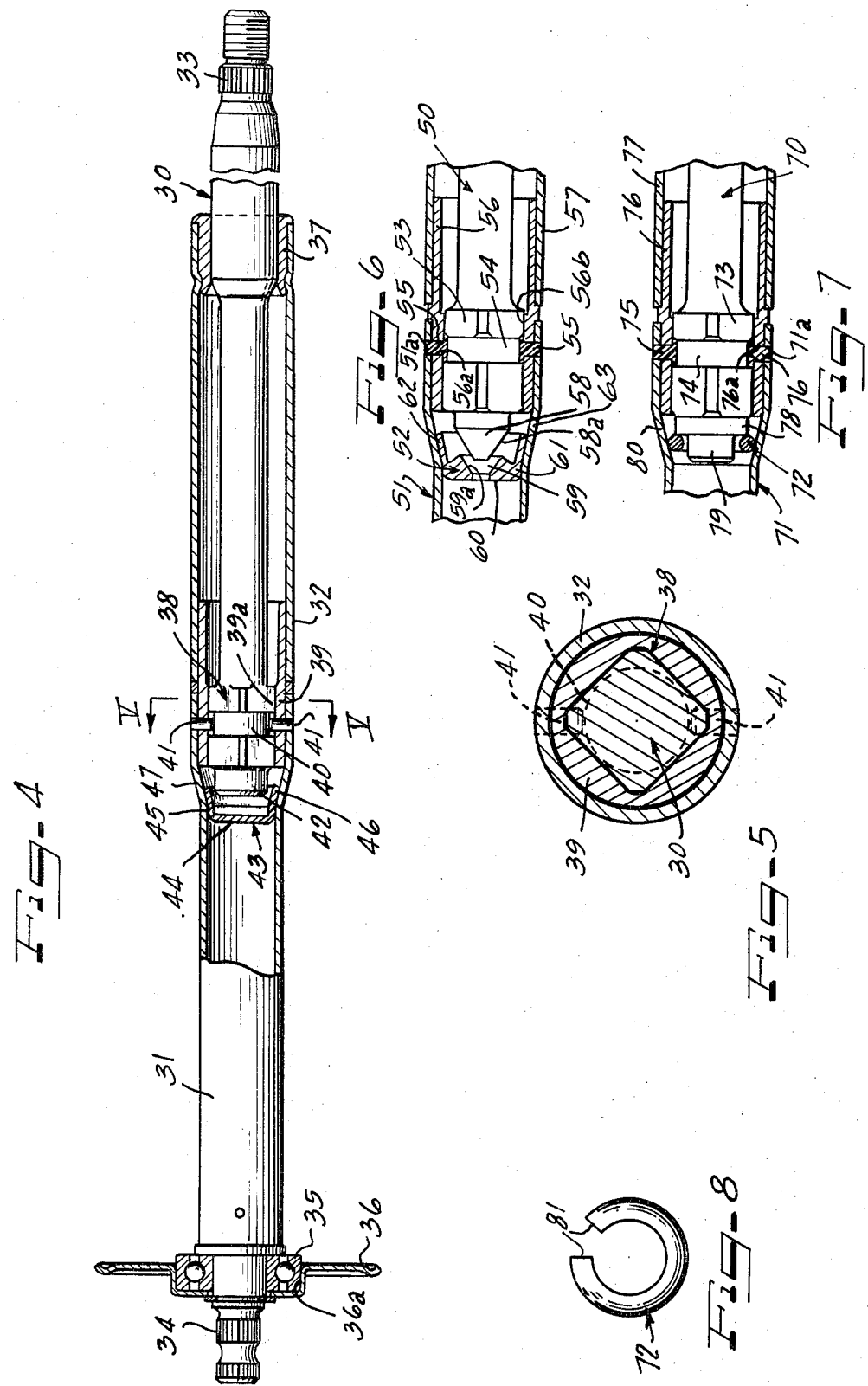

3,851,542

COLLAPSIBLE STEERING COLUMNS

BACKGROUND OF THE INVENTION

1. Field of the Invention

This invention relates to steering column assemblies for vehicles, and is more particularly concerned with energy absorbing collapsible steering columns.

2. Description of the Prior Art

For vehicles, particularly automobiles, the provision of a collapsible steering column has long been recognized as desirable to provide an added safety factor for the driver of the vehicle in the event of an accident. There is a considerable number of different types of steering column assemblies which provide for energy absorption on axial collapse, and the majority of these assemblies effect energy absorption by the progressive deformation of one or more members. It is, however, inherent in these designs that energy absorption is a built-in feature, and it would be a major design problem to convert such steering column assemblies from the type in which energy absorption is present to a type of collapsible assembly which does not feature energy absorption. In certain instances, it may be desirable, or necessary, to have free axial collapse of the steering column assembly on the imposition of an abnormal axial load without any real energy absorption being involved. In such cases, the well known collapsible steering column assemblies would be suitable.

SUMMARY OF THE INVENTION

It is highly desirable and therefore a primary object of the present invention to provide a collapsible steering column assembly for a vehicle in which the assembly is readily convertible from one in which energy absorption is present to one in which the column collapses freely on the imposition of an abnormal axial load.

Another object of the invention is to provide a collapsible steering column assembly for a vehicle in which the assembly is quite simple and utilizes few components in its construction.

According to the present invention, the foregoing objects are achieved in that there is provided a collapsible steering column assembly for a vehicle including a first steering torque transmitting member which is adapted to receive a steering wheel, a second steering torque transmitting member which is adapted to be connected to a steering mechanism of a vehicle. The first and second members are axially aligned and connected together for the transmission of steering torque with one of the members being capable of axial movement within the other on axial collapse of the assembly due to the imposition of an abnormal axial load. A third member, separate from the first and second members, is constructed and located in such a manner that on axial collapse of the assembly the third member is forced by one of the first-mentioned members progressively through the other of the members to deform and/or be deformed by the other member with consequent absorption of energy.

More specifically, the invention provides a collapsible steering column assembly as discussed above in which the first member is a shaft, the second member is a tube mounted concentrically around the shaft and the third member is a shaped construction in the form of a plug, dish, ring or the like which has a rim portion which is greater than the internal diameter of the tube and mounted within the tube adjacent one end of the shaft. Preferably, the shaft is provided with a nose at one end for contacting the third member and forcing the same through the tube on axial collapse of the assembly.

Advantageously, the second member may be a tube having two internal diameters and the third member may be located at a shoulder or conical section which joins the two parts of different diameters.

The third member may, as indicated above, be other than a plug so long as it is formed separately from the first and second members, and will be progressively deformed and/or deformed by one of the other members on axial collapse of the assembly.

BRIEF DESCRIPTION OF THE DRAWINGS

Other objects, features and advantages of the invention, its organization, construction and operation will be best understood from the following detailed description of exemplary embodiments of the invention taken in conjunction with the accompanying drawings, on which:

FIG. 1 is a side elevation of a steering column assembly constructed in accordance with the principles of the present invention;

FIG. 2 is a cross sectional elevation of the steering column assembly illustrated in FIG. 1;

FIG. 3 is a cross sectional view of the apparatus illustrated in FIG. 2 taken generally along the line III—III;

FIG. 4 is a cross sectional side elevation of an alternative form of collapsible steering column assembly constructed in accordance with the principles of the present invention;

FIG. 5 is a sectional view taken generally along the line V—V of FIG. 4;

FIG. 6 is a cross sectional side elevation of part of a further form of steering column assembly constructed in accordance with the principles of the present invention;

FIG. 7 is a cross sectional side elevation of yet another form of steering column assembly constructed in accordance with the principles of the present invention; and FIG. 8 is a plan view of the split ring utilized as the deforming member in FIG. 7.

DESCRIPTION OF THE PREFERRED EMBODIMENTS

Referring to FIGS. 1 to 3, a collapsible steering column assembly is illustrated as comprising a first steering torque transmitting member 1 or upper member, and a second steering torque transmitting member 2 or lower member, the upper member 1 being adapted at 3 (for example by serrations and a threaded stud) for connection to a conventional steering wheel of a vehicle and the lower member 2 being fixed to a short lower shaft 4 adapted at 5 (by serrations) for connection to the steering mechanism of the vehicle. As will be seen from the drawing, the upper member 1 is in the form of a shaft, and the lower member 2 is in the form of a tube. The largest diameter of the shaft 1 is smaller than the internal diameter of the tube 2. The tube 2 is provided with a tubular extension 6 of a larger diameter than the diameter of the tube 2, the tube and extension 6 being connected by a shoulder 7 which has a conical longitudinal cross section.

An upper outer casing member 8 surrounds the upper part of the torque transmitting assembly and carries a bracket 9 for connection to the dashboard of the vehicle by bolts which are received through holes 10. The upper member 1 is axially guided within the upper outer member 8 by means of a bushing 11.

A bushing 12 is located about the lower torque transmitting member 2 within the lower end of the upper outer member 8. The bushing 12 is also located within the upper end of an outer lower member 13. The short lower shaft 4 is carried within a bearing 14 held within a recess 15a in the bulkhead or firewall 15 of the vehicle and the lower end of the outer lower member 13 is also housed within the recess 15a.

The lower end of the upper torque transmitting member 1 is provided with a series of longitudinally extending serrations or keyways 16 and with a peripheral groove 17. The lower end of the member or shaft 1 is also provided with an integral nose 18.

Surrounding the lower part of the shaft 1 is a sleeve 19 which is provided with internal serrations or keyways 19a which mate with the keyways 16 of the shaft 1. The sleeve 19 is welded or otherwise fixed to the extension 6 of the lower torque transmitting member 2 and, thus, steering torque can be transmitted from the steering wheel and the shaft 1 through the sleeve 19 to the lower member 2 and the steering gear. To prevent relative axial movement between the shaft 1 and the sleeve 19 during normal use of the assembly, shear pins 20 are provided. The shear pins may conveniently be made of plastic material and each include a base 20a which seats in the peripheral groove 17 and a projection 20b which extends through aligned holes 20c, 20d in the members 19 and 6, respectively.

An extension tube 21 is welded to the sleeve 19 and extends upwardly along the shaft 1 to terminate in a stabilizing bearing 22 disposed between the upper end of the tube 21 and the shaft 1.

The third member of the combination according to the invention is provided at the lower end of the shaft 1 as a separate unit, and in this particular embodiment comprises a plug 23. As can be seen from the drawing, the plug 23 is a tapered plug and has a rim 24 which has a diameter greater than the internal diameter of the lower tube 2. From the rim 24 the plug 23 tapers until in the region of its other end 25 it is cylindrical and has a diameter equal to the internal diameter of the tube 2.

The plug 23 may be made from any suitable resilient rubbery material such as, for example, silicone rubber, nitrile/neoprene rubber or a polyurethane plastic.

In use, if an abnormal axial load is imposed upon the assembly due to, for example, an accident, and the upper shaft 1 is forced downwardly and axially into the tube 2, the shear pins 20 will shear, and the nose 18 of the shaft 1 will force the plug 23 into the lower tube 2 progressively deforming the tube 2 and/or the plug 23 itself. As this deformation takes place, there will be consequent energy absorption with the result added safety factor for the driver of the vehicle.

During axial collapse, the resistance to motion of the third member (plug 23) down the tube 2 may progressively diminish as the external dimension of the third member approaches the internal diameter of the tube. Simultaneously, the impact energy may be diminishing at a similar rate with the result that there may well be a smooth and steady collapse of the assembly.

As will be appreciated in reference to FIG. 2, because the sleeve 19 is welded or otherwise fixed to the extension 6 of the tube 2, as the column collapses the keyways or serrations 16 will merely slide within the corresponding serrations or keyways 19a in the sleeve 19 and the facility of being able to utilize the column for steering the vehicle will be retained. Therefore, even on final collapse of the column, the ability to steer the vehicle will not be lost by any malfunction of the steering column. Referring now to the embodiment illustrated in FIGS. 4 and 5, it will be seen that there is provided an upper torque transmitting member 30 in the form of a shaft and a lower torque transmitting member 31 in the form of a tube. For ease of illustration, the outer members of the steering assembly have been omitted in FIG. 2. The lower torque transmitting member 21 has an extension 32 of a diameter greater than the internal diameter of the tube 31. The upper end of the shaft 30 is adapted at 33 (as in FIG. 2) for the reception of a steering wheel. The lower end of the tube 31 is provided at 34 (in a manner similar to FIG. 2) for connection to the steering gear of the vehicle. The lower end of the tube 31 is mounted in a bearing 35 located in a recess 36a in the firewall or bulkhead 36 of the vehicle. The extension 32 is provided at its upper end with a stabilizing bearing 37 which bears upon the shaft 30.

At the lower end of the shaft 30 a head 38 is provided. The head 36 has a square cross section and is located in a square section bore 39a in a sleeve 39 which is welded or otherwise fixed to the extension 32. The shaft 30 includes a nose 42 integral therewith.

The third member of the combination in this embodiment of the invention is provided as a dish-shaped member 43 which has a base 44 and a cylindrical sidewall portion 45 with an outside diameter equal to the internal diameter of the tube 31. An outwardly flared portion 46 extends from the cylindrical sidewall portion 45 and has an external taper equal to the taper of a shoulder or conical section 47 which connects the tube 31 to the extension 32.

The maximum cross section dimension of the shaft 30 is smaller than the internal diameter of the tube 31 so that if the third member 43 is not present and the shear pins 41 are broken, the two parts of the assembly can telescope freely.

During use, and if an abnormal load is imposed axially on the assembly, the shear pins 41 will be broken and the two parts 30 and 31 will be subject to axial collapse. The nose 42 of the shaft 30 will force the dish-shaped third member 43 downwardly through the tube 31. The flared portion 46 of the member 43 will be deformed at the same time as the wall of the tube 31 will be deformed. The amount of deformation of each member is dependent upon the material of which the members are made and their inherent rigidity. Therefore, only one of the members may be progressively deformed or both of the members may be so deformed simultaneously.

As with the previous embodiment illustrated in FIGS. 1–3, the resistance to motion of the third member 43 down the tube 31 may progressively diminish as the external dimension of the third member 43 approaches the internal diameter of the tube 31. Therefore, a smooth and steady collapse of the assembly will be achieved.

Referring now to FIG. 6, a further embodiment of the invention is illustrated as comprising an upper torque transmitting member 50 in the form of a shaft and a lower torque transmitting member 51 in the form of a tube, and a third member 52 which is separate from the shaft 50 and the tube 51 so that, if free collapse of the column is desired, the third member 52 may be omitted from the assembly.

The lower end of the shaft 50 includes a head 53 having a peripheral groove 54 which receives the basis of shear pins 55 as in the previously disclosed apparatus. The shear pins 55 extend through aligned holes 56a and 51a of the sleeve 56 and the tube 51, respectively.

The sleeve 56 is welded or otherwise fixed to an extension 57 of the tube 51. The head 53 has a square lateral cross section and is received in a bore 56b in the sleeve 56 which also has a square cross section. Thus, torque may be transmitted from the shaft 50 through the sleeve 56 to the tube 51.

The head 53 includes a downwardly projecting nose 58 which is tapered as defined by the surface 58a and the dish-shaped third member 52 is provided with a central aperture 59 having a taper similar to the taper of the nose 58 as defined by a complemental conical surface 59a.

The third member 52 includes a base 60 and a short cylindrical portion 61 which has an outside diameter equal to the internal diameter of the tube 51. Extending from this short cylindrical portion 61 is an outwardly flared portion 62 which tapers similarly to the taper of a part 63 which joins the tube 51 to its extension 57.

As in the previous embodiments, if the third member 52 is not present, and the shear pins 55 are broken, the shaft 50 will be able to telescopically pass freely down the tube 51. However, during use, if an abnormal axial load is imposed upon the assembly, the shaft 50 in passing into the tube 51 breaks the shear pins 55 and the nose 58 engages within the aperture 59 of the third member 52. The third member 52 is then forced down the tube 51 at the same time progressive deformation of the third member 52 and/or the tube 51 takes place with progressive expenditure of energy.

In a further embodiment of the invention illustrated in FIGS. 7 and 8, the collapsible steering column assembly is illustrated as comprising an upper first member 70 in the form of a shaft which cooperates with a second member 71 in the form of a tube in a telescopic manner, as disclosed above with reference to the other embodiments, and a third member 72 in the form of a ring.

The shaft 70 includes a head 73 of square cross section as in the embodiments illustrated in FIGS. 4–6. The head 73 includes a peripheral groove 74 for receiving the basis of two shear pins 75 which extend through aligned holes 76a, 71a of a sleeve 76 and the tube 71, respectively. The sleeve 76 is welded or otherwise fixed to an extension 77 of the tube 71. The head 73 further comprises a downwardly extending two-part integral nose having a base part 78 and a part 79 of reduced diameter. As will be seen from FIG. 7, a ring 72 is located, during normal torque transmitting operations of the steering column assembly, in the vicinity of a tapered portion 80 which connects the tube 71 and its extension 77. More specifically, the ring 72 surrounds the part 79 and abuts the base part 78 of the two-part nose.

As will be seen from FIG. 8, the ring 72 is split at 81 to have a gap therein. The ring 72 is made of spring steel, and therefore the diameter of the ring may be varied so as to close the gap when the ring is radially compressed. As will be seen from FIG. 7, during normal use of the assembly, the outside diameter of the ring 72 is greater than the internal diameter of the tube 71, but on axial collapse of the column, when the nose base 78 forces the ring 72 into the tube 71, the ring 72 will be progressively closed so that the gap is substantially closed. It will be apparent that the diameter of the reduced nose portion 79 is smaller than the internal diameter of the ring 72, so as to accommodate any closing of the ring 72 which may occur during axial collapse of the column.

In accordance with the invention, the third member may be of a shape other than those specifically described above, so long as the member is formed separately from the first and second members of the assembly. This construction is of particular advantage if it is desired to provide a steering column assembly which is not energy absorbing, in which case the third member may be omitted from the assembly and on axial collapse of the assembly the first and second members will pass freely into each other in a telescopic manner.

It will be appreciated that the tubular assembly, as mentioned in the embodiments discussed above in which the shaft is the upper member and the tube is the lower member, may be reversed and the shaft may form the lower part which is connected to the steering gear of the vehicle and the tube may form the upper part which is connected to the steering wheel of the vehicle. Many other changes and modifications of the invention may become apparent to those skilled in the art without departing from the spirit and scope of the invention, and it is to be understood that we intend to include within the patent warranted hereon all such changes and modifications as may reasonably and properly be included within the scope of our contribution to the art.

We claim:
1. A collapsible steering column assembly comprising:
   first and second coaxially and telescopically related torque transmitting members for connection between a steering wheel and a steering gear of a vehicle;
   coupling means connecting said first and second members for mutual rotation;
   at least one shearable member connecting said first and second members to normally prevent relative telescopic movement therebetween and shearable to permit relative telescopic movement upon the application of an abnormal axial load on said assembly; and
   a third member, separate from said first and second members, disposed between said first and second members, said third member forced axially through the outer one of said coaxial members by the inner one of said coaxial members upon application of an abnormal axial load and including at least a portion having a lateral dimension greater than that of the outer member which causes progressive deformation of said members and consequent energy absorption, said first member including a shaft, said second member including a tube mounted coaxially about said shaft, said shaft including a section having a polygonal cross section, and comprising a sleeve mounted within said tube and having a complemental polygonal bore receiving said polygonal cross section of said shaft, said section of said shaft including means defining a peripheral groove therein, said shearable member including a shear pin extending through said tube and said sleeve and into said groove.

2. A collapsible steering column assembly as claimed in claim 1 comprising a bearing receiving said shaft therein and mounted in said tube for supporting said shaft.

3. A collapsible steering column assembly as claimed in claim 1, wherein said third member comprises a ductile material and progressively deforms during relative telescopic movement of said first and second members.

4. A collapsible steering column assembly as claimed in claim 1, wherein said third member comprises a ductile material selected from the group consisting of mild steel, aluminum, copper and plastics.

5. A collapsible steering column assembly as claimed in claim 1, wherein said third member comprises a ductile material selected from the group consisting of silicone rubber, nitrile/neoprene rubber and a polyurethane plastic material.

6. A collapsible steering column assembly as claimed in claim 1, wherein said polygonal cross section of said shaft section is a square cross section and said complemental polygonal bore of said sleeve is a complemental square bore.

7. A collapsible steering column assembly comprising:
first and second coaxially and telescopically related torque transmitting members for connection between a steering wheel and a steering gear of a vehicle;
coupling means connecting said first and second members for mutual rotation;
at least one shearable member connecting said first and second members to normally prevent relative telescopic mvement therebetween and shearable to permit relative telescopic movement upon the application of an abnormal axial load on said assembly; and
a third member, separate from said first and second members, disposed between said first and second members, said third member forced axially through the outer one of said coaxial members by the inner one of said coaxial members upon application of an abnormal axial load and including at least a portion having a lateral dimension greater than that of the outer member which causes progressive deformation of said members and consequent energy absorption,
said first member including a shaft, said second member including a tube mounted coaxially about said shaft, said tube including two sections of different diameter and a shoulder section joining said two sections, and said third member including a dish-shaped member mounted within said tube in the area of said shoulder section, and said shaft including an end mounted adjacent and spaced from said dish-shaped member.

8. A collapsible steering column assembly as claimed in claim 7, wherein said dish-shaped member includes a base portion having an external diameter equal to the internal diameter of said tube and a sidewall portion extending from said base portion and lying along said shoulder section and generally directed in the axial direction toward said shaft.

9. A collapsible steering column assembly as claimed in claim 8, wherein said base portion of said dish-shaped member includes an aperture therethrough having a shaped internal surface and said shaft includes an end extending adjacent said base portion and having a complemental surface to be received by the aperture in said base portion upon axial collapse of the assembly.

10. A collapsible steering column assembly comprising:
first and second coaxially and telescopically related torque transmitting members for connection between a steering wheel and a steering gear of a vehicle;
coupling means connecting said first and second members for mutual rotation;
at least one shearable member connecting said first and seocnd members to normally prevent relative telescopic movement therebetween and shearable to permit relative telescopic movement upon the application of an abnormal axial load on said assembly; and
a third member, separate from said first and second members, disposed between said first and second members, said third member forced axially through the outer one of said coaxial members by the inner one of said coaxial members upon application of an abnormal axial load and including at least a portion having a lateral dimension greater than that of the outer member which causes progressive deformation of said members and consequent energy absorption,
said first member including a shaft, said second member including a tube mounted coaxially about said shaft, said tube including two sections of different diameter and a shoulder section joining said two sections, said shaft including an end having a base portion and a reduced portion extending from said base portion, and said third member including a split ring disposed about said reduced portion and against said base portion in the area of said shoulder section and having an external diameter greater than the internal diameter of said tube and an internal diameter greater than the external diameter of said reduced portion.

11. A collapsible steering column assembly comprising:
first and second coaxially and telescopically related torque transmitting members for connection between a steering wheel and a steering gear of a vehicle;
coupling means connecting said first and second members for mutual rotation;
at least one shearable member connecting said first and second members to normally prevent relative telescopic movement therebetween and shearable to permit relative telescopic movement upon the application of an abnormal axial load on said assembly; and a third member, separate from said first and second members, disposed between said first and second members, said third member forced axially through the outer one of said coaxial members by the inner one of said coaxial members upon application of an abnormal axial load and including at least a portion having a lateral dimension greater than that of the outer member which causes progressive deformation of said members and consequent energy absorption, said first member including a shaft and said second member including a tube mounted coaxially about said shaft, and said third member comprising a plug including a first portion disposed within and of the same general diameter as the inner diameter of said tube and a second portion disposed adjacent an end of said shaft and having a diameter greater than the inner diameter of said tube.

12. A collapsible steering column assembly comprising:

first and second coaxially and telescopically related torque transmitting members for connection between a steering wheel and a steering gear of a vehicle;

coupling means connecting said first and second members for mutual rotation;

at least one shearable member connecting said first and second members to normally prevent relative telescopic movement therebetween and shearable to permit relative telescopic movement upon the application of an abnormal axial load on said assembly; and a third member, separate from said first and second members, disposed between said first and second members, said third member forced axially through the outer one of said coaxial members by the inner one of said coaxial members upon application of an abnormal axial load and including at least a portion having a lateral dimension greater than that of the outer member which causes progressive deformation of said members and consequent energy absorption, said second member including a tube, said first member including a shaft coaxially disposed within said tube and including longitudinally extending surface serrations, and said coupling means comprising a sleeve within said tube and coaxial with said tube and said shaft, said sleeve fixed to said tube for rotary movement and including an internal surface having serrations for mating with serrations on said shaft during axial collapse of the assembly to maintain the steering ability of the vehicle upon collapse of the assembly.

* * * * *